(12) United States Patent
Rougas

(10) Patent No.: US 6,414,622 B1
(45) Date of Patent: Jul. 2, 2002

(54) ANTI-RADAR MISSILE (ARM) COUNTERMEASURE METHOD

(75) Inventor: John A. Rougas, Syracuse, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/742,501

(22) Filed: Dec. 21, 2000

Related U.S. Application Data

(60) Provisional application No. 60/172,963, filed on Dec. 21, 1999.

(51) Int. Cl.⁷ ................................................. G01S 7/36
(52) U.S. Cl. ....................................................... 342/13
(58) Field of Search ............................... 342/137, 20, 9, 342/187

(56) References Cited

U.S. PATENT DOCUMENTS

| | | | | |
|---|---|---|---|---|
| 4,347,513 A | * | 8/1982 | Schindler | 343/18 |
| 4,433,333 A | * | 2/1984 | Manoogian et al. | 343/18 |
| 4,538,152 A | * | 8/1985 | Wirth | 343/5 |
| 4,646,098 A | * | 2/1987 | Mattern et al. | 342/14 |
| 4,990,919 A | | 2/1991 | Manoogian | 342/13 |
| 5,294,930 A | * | 3/1994 | Li | 342/13 |
| RE35,553 E | * | 7/1997 | Li | 342/13 |

* cited by examiner

Primary Examiner—Thomas H. Tarcza
Assistant Examiner—Brian Andrea
(74) Attorney, Agent, or Firm—Duane Morris LLP

(57) ABSTRACT

A method of protecting a pulse radar from a missile attempting to home on interrogating pulses emitted by such radar, said method comprising the steps of providing a plurality of decoys at different locations in the vicinity of the pulse radar, each one of the decoys being adapted, when activated, to emit pulses of a given amplitude and duration; activating, when each one of the interrogating pulses is generated in the pulse radar, a selected decoy to lead the remaining decoys in the plurality of decoys for a period of time determined by range and range rate measurements of a pulse Doppler missile warning sensor, changing the decoy selected to lead the remaining decoys in the plurality of decoys at a time determined from range and range rate measurements of a pulse Doppler missile warning sensor thereby defining a blink rate associated with the decoys, to form a covering pulse overlapping the then emitted one of the interrogating pulses; and adaptively changing the blink rate and determining an associated maneuver change of said missile in response thereto, to obtain the blink rate that provides the maximum maneuver change associated with the missile.

13 Claims, 4 Drawing Sheets

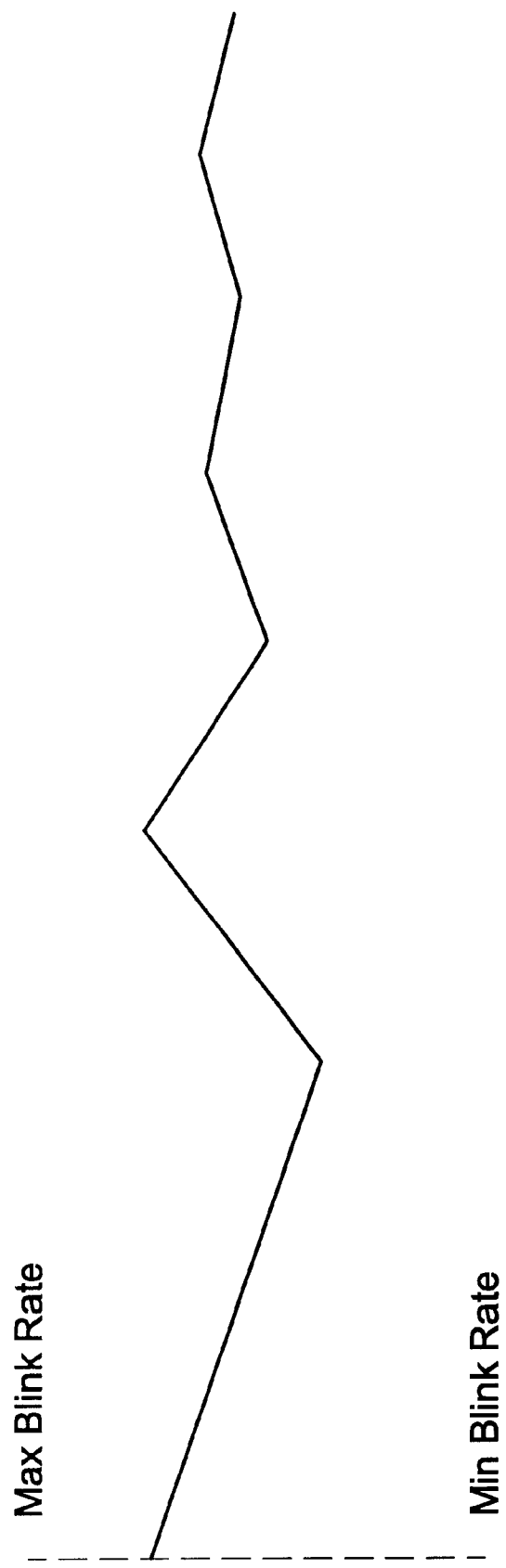

ANTI-RADAR MISSILE (ARM) COUNTERMEASURE METHOD

RELATED APPLICATION

This application claims priority of U.S. patent application 60/172,963, entitled RADAR ANTI-RADIATION MISSILE (ARM) COUNTERMEASURE (CM) TECHNIQUE, filed Dec. 21, 1999, the entire disclosure of which is hereby incorporated by reference.

FIELD OF THE INVENTION

The present invention pertains generally to radar systems, and particularly to radar systems that use synchronous pre-pulsed anti-radiation missile decoys.

BACKGROUND OF THE INVENTION

It is well known in the art that an anti-radiation missile (ARM) is adapted to home on radio frequency (RF) signals radiated so that an explosive charge carried by such a missile may destroy a radar. To accomplish such homing, the guidance system in an ARM missile may be designed to lock onto the leading or trailing edge of radar interrogating pulses, as well as midpulse samples of such pulses. It is therefore desirable that, in order to increase the chance of survivability of a radar attacked by an ARM missile, decoys located in the vicinity of the radar be actuated to generate RF signals to cause the guidance system in an attacking ARM missile to home on an apparent source spaced from the radar. Thus, RF signals from the decoys are synchronized with the interrogating signals from the radar so that the RF signals from the decoys produce pulses overlapping (in power and time) the interrogating pulses produced by sidelobes of the antenna in the radar. Consequently, the guidance system in an attacking ARM missile is inhibited from using the leading or trailing edges or midpulse samples of the radar's interrogating pulses to accurately derive guidance commands. Further, the decoys are caused to "blink". That is to say, position in time, relative to the defended radar of each of the decoys is periodically altered. As a result of such "blinking" the aim point of the ARM is caused to wander, thereby preventing the ARM from homing on the radar or any one of the decoys. A system that alters the blinking time at the rate of the radar's pulse repetition frequency is described in U.S. Pat. No. 4,990,919, issued Feb. 5, 1991 to Manoogian entitled MISSILE DECOY SYSTEM. This system, however, suffers from significant drawbacks, such as relying only on open-loop pulse-to-pulse switching of the lead decoy. Furthermore, the above system, which changes the lead decoy on a pulse-by-pulse basis, is not a viable technique to assure decoy survivability. Bias errors in any real anti-radiation missile (ARM) seeker will tend to drift toward one of the decoys because of the noise-like pulse-by-pulse switching. Thus, if the ARM has a bias of 1 millivolt "UP" and 1 millivolt "RIGHT", after, a number of pulses (e.g. one thousand pulses) the ARM will have migrated or drifted to the up-most, right-most decoy eventually destroying it before homing in on the next target.

Other decoy blink and pre-pulse strategies use an open loop approach based on typical assumed threat guidance loop parameters or time constants and are not altered on a radar pulse-by-radar pulse basis. In these systems, the blink rate is approximately equivalent to one missile guidance loop time constant as estimated from simulations. An ability to monitor ARM range and range rate to provide an estimate of time-to-go (or time since maneuver) in the scenario in order to increase survivability of the radar and decoys is highly desired.

SUMMARY OF THE INVENTION

The present invention directly addresses the rate at which the lead decoy should be altered based on a closed loop measurement of the response of an ARM to the change in position caused when the leading decoy is changed. The present invention couples this information with the gross angle of arrival (a quadrant) and the known relative positions of the decoys to intelligently control the decoy blink rate in a closed loop approach that can be "tuned" to the missile guidance loop's impulse response to induce the maximum miss distance constant with maximizing the impact point away from the defended radar. One approach to this is to monitor the ARM's range rate in response to decoy blinking actions. Those actions producing the largest range rate differences as decoy blink rate is swept over small time increments should revert immediately to the previous condition of blink rate, effectively zeroing in on the blink rate producing the maximum missile maneuvers (indicated by the changes in range rate). This activity continues until the ARM impacts, indicated by the loss of target in the missile warning radar. At this point the decoy system may revert to its default open loop blink rate condition as determined by simulation.

The invention improves the probability of survival of radars defended by decoys as well as the probability of survival of the decoys themselves by incorporating the range, range rate and quadrant of attack of the ARM; information readily available from low cost missile warning radars.

The present invention is embodied in a method of protecting a pulse radar from a missile attempting to home on interrogating pulses emitted by such radar, the method comprising the steps of providing a plurality of decoys at different locations in the vicinity of the pulse radar, each one of the decoys being adapted, when activated, to emit pulses of a given amplitude, frequency and duration; sequentially activating a selected decoy in the plurality of decoys to be the leading decoy in time relative to the other decoys and the radar, to form a covering pulse overlapping the then emitted one of the interrogating pulses; and adaptively changing the blink rate in response to an associated maneuver change of the ARM in response thereto by incorporating outputs of a low cost missile warning sensor, to obtain the blink rate that provides the maximum maneuver change associated with the ARM.

BRIEF DESCRIPTION OF THE DRAWINGS

FIG. 4 is a chart illustrating the change in slope of blink rate in response to changes in the ARM velocity vector to obtain a value that produces maximum velocity changes according to the present invention.

DETAILED DESCRIPTION OF THE INVENTION

Before embarking on a detailed discussion, the following should be understood. In prior art open loop systems, blink rates have often been determined via simulation to provide a compromise solution over the entire threat spectrum. Such systems fail to provide any indication of ARM response to blink rate, and further fail to provide any optimization of blink rate relative to the ARM. However, failure to optimize the blink rate and tune the decoy system to the particular target can result in compromised ARM defense performance, and in certain situations, fatal consequences.

As described herein, the present invention implements a closed loop approach to protecting a radar system by using multiple decoys that sequentially transmit pulses at amplitudes, frequencies, and duration to cover a radar interrogation pulse, and sensing maneuver changes associated with the ARM in response to changing blink rates associated with the decoys, in order to determine the optimal blink rate that maximizes ARM maneuvers.

Figure 1:
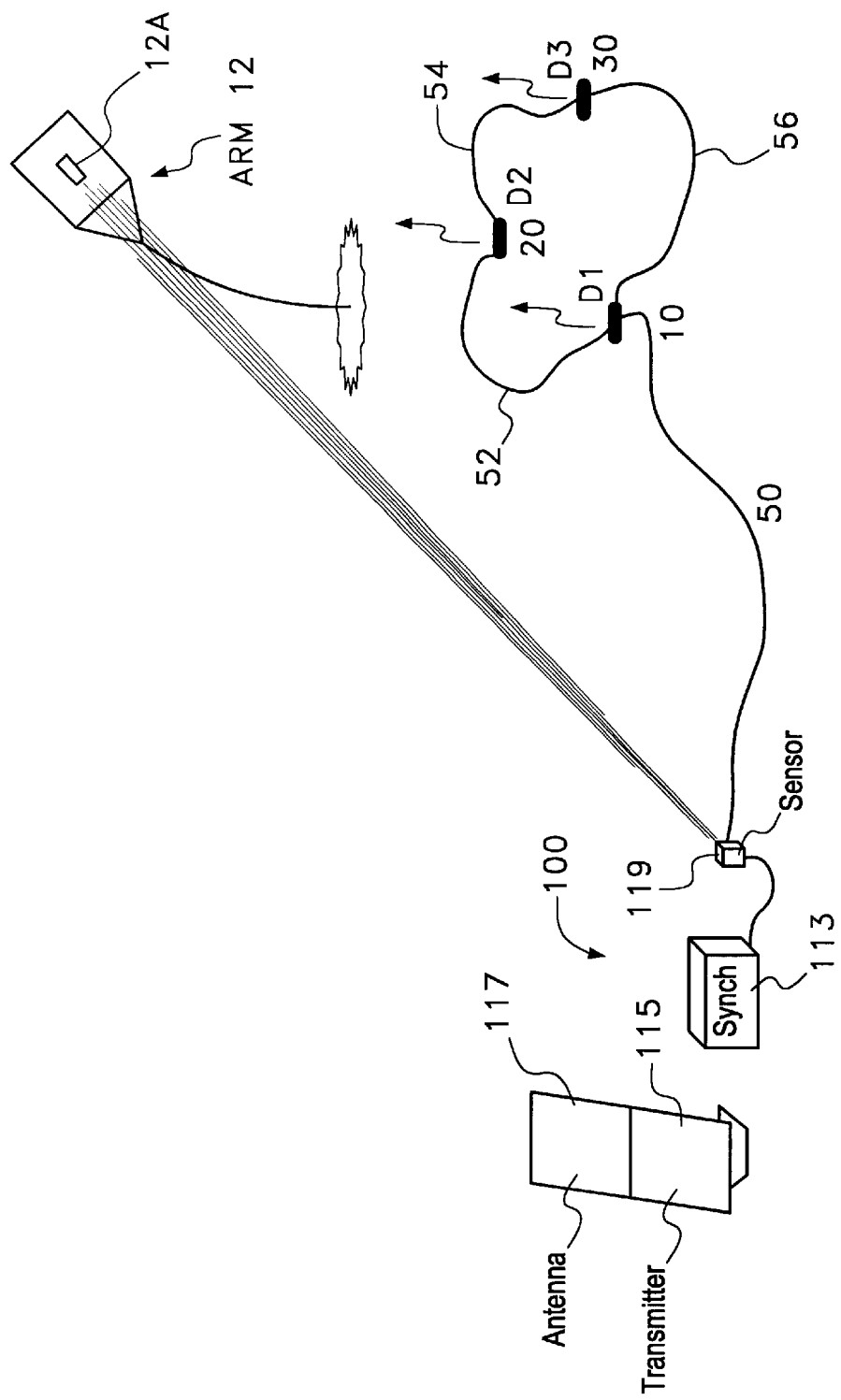
FIG. 1 illustrates a configuration of the major functional components associated with the radar system and decoys for implementing the countermeasure technique according to the present invention.

FIG. 1 shows a system wherein a plurality of decoys D1, D2 and D3 are placed at separate locations in the vicinity of a radar system 100. Each of the decoys is linked to the pulse Doppler missile warning sensor system 119 through a data link 50, and to one another via links 52, 54 and 56. The radar system 100 comprises a radar emitting interrogating pulses radiated by an antenna 117 and received by an ARM 12 which then attempts to home on the radar antenna 117. A synchronizer 113 in the radar 100 is arranged to control a pulse Doppler missile warning sensor system 119, thereby producing measurements of the ARM 12 range and range rate. In this fashion the decoys are operated synchronously with the radar so as to transmit just before transmission of the radar pulse. The pulse Doppler missile warning sensor system 119 operates to receive pulse Doppler measurement of range and range rate associated with the ARM 12 in order to obtain an accurate measurement of ARM sensitivity to decoy blink rate. In response to sensing maneuver changes associated with the ARM, the pulse Doppler missile warning sensor, via conventional timing circuitry performs variable rate, variable slope timing logic based on time-to-go (TTG) and range rate, and provides data for changing the blink rate associated with the decoys. The sensor includes a bank of filters for receiving the Doppler signal information and performing FFT processing thereon to determine maneuver change information.

Figure 2:
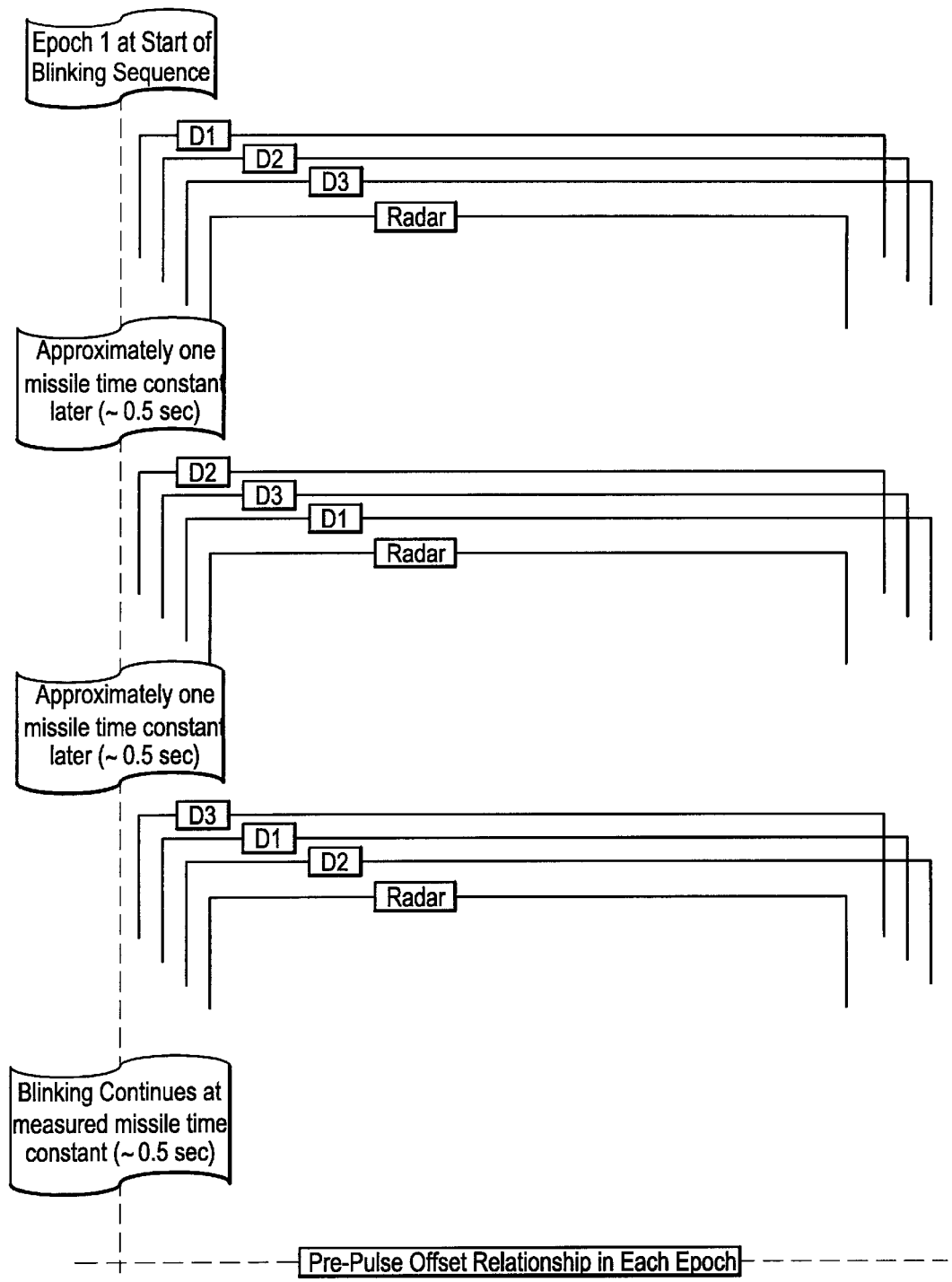
FIG. 2 illustrates the adaptive rate of change of the sequence of pulses from each one of the decoys shown in FIG. 1 according to the present invention.

In a particular embodiment, the duty factor of the transmitter 115 is on the order of 20 percent, although other duty factors may be used. The synchronizer 13 is also arranged to produce control signals for the decoys D1, D2, D3 so that decoy pulses having a predetermined frequency and interrogating pulses here are produced in the orders as shown in FIG. 2. Each one of the decoys D1, D2, D3 has a duty factor equal to or greater than the duty factor of the transmitter 115.

Referring now to FIG. 2, a radar emits a series of interrogating pulses, as shown therein. It is understood that a guidance system 12A in the ARM 12 comprises known circuitry to produce guidance commands that cause the ARM 12 to home on a source of RF signals. Thus, if only the radar 100 were radiating RF signals in the form of interrogating pulses, the guidance system 12A would respond to a pre-selected portion, for example, the leading edge, the trailing edge or a midpulse sample, of each successive one of the interrogating pulses, ultimately to generate guidance commands whereby the ARM 12 is caused to home on the radar 100 and or the radar antenna 117. Here, however, the pulse Doppler missile warning sensor 119 is arranged to provide control signals to each one of the decoys D1, D2, D3 so as to cause each of the decoys to become, when adapted by the range and range rate measurements of the pulse Doppler sensor system 119, the lead signal source, as shown in FIG. 2. The rate at which this adaptation takes place (measured along the vertical axis in FIG. 2) is determined by the measurements of range and range rate performed in the pulse Doppler missile warning sensor. In addition, the covering pulses for an exemplary interrogating pulse is shown in illustrations in FIG. 2. Inspection of the timing sequences demonstrates that: (a) each covering (D1, D2, D3) pulse overlaps the interrogating pulse; (b) the amplitude of the covering pulse is always greater than the amplitude of the interrogating pulse; and (c) each covering pulse from the leading decoy differs from the other two decoy pulses in relative time position from the interrogating pulse. FIG. 2 illustrates the pre-pulse relationships shown in each epoch of the blinking period. Each epoch period is approximately 0.5 seconds as a default setting and is adaptively changed by the action of the sensor's measurement of missile response to decoy position changes. Within a short time interval (e.g. a few seconds) of acquisition and resolvable Doppler measurements, the epoch (blink period) is optimized for the remainder of the flight.

The inventive technique couples the above discussed decoy system and operation with a pulse Doppler missile warning sensor that senses the incoming ARM and measures the timing associated with the ARM by sensing the Doppler shift resulting from the change in missile course as a result of the blink rate over a given interval associated with the decoys. The rate at which a signal becomes the leading source is modified over a given interval and the Doppler shift is measured by the pulse Doppler missile warning sensor in order to determine the degree of maneuver change of the ARM relative to the previous maneuver change.

Figure 3:
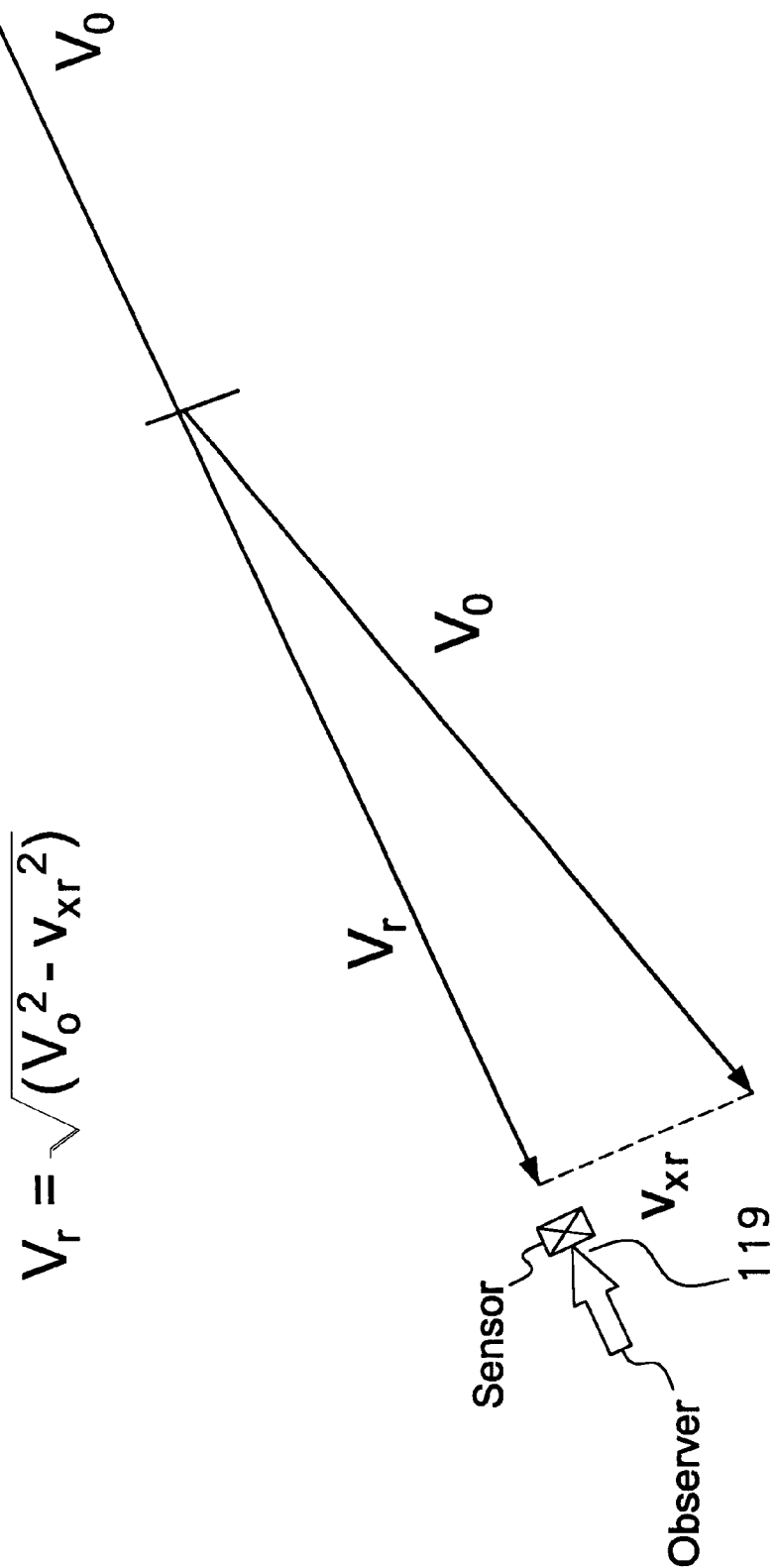
FIG. 3 illustrates the missile warning sensor's determination of relative velocity change due to an ARM maneuver according to the present invention.

FIG. 3 illustrates the pulse Doppler missile warning sensor's determination of relative velocity change due to an ARM maneuver. As shown therein, the pulse Doppler missile warning sensor 119 measures the relative velocity change resulting from a maneuver as $V_r = (V_o^2 - V_{xr}^2)^{1/2}$ where $V_{xr}$ is proportional to $R_\Theta$ and where R is the range to the measurement sensor and $\Theta$ (theta) is the angle between apparent targets as seen by the ARM. Note that the direction associated with vector A represents the initial heading at $V_o$ while the direction associated with vector B represents the heading after a maneuver, which reduces the apparent $V_o$ at the pulse Doppler missile warning sensor 119. FIG. 4 illustrates the convergence associated with adjusting the blink rate of the decoys in response to changes in the ARM velocity vectors in order to obtain a value that produces maximum velocity changes in order to maximize ARM maneuvers.

As is understood, the present system and method described herein operates to obtain and maintain an optimum blink rate without any prior knowledge of the ARM missile time constants in order to create a large ARM miss distance relative to the defended radar system independent of the attack arrival angle.

The invention may be embodied in a missile warning radar sensor system such as the AN/ALQ-156 A Missile Warning Radar System incorporating a Low power UHF transmitter, 4 quadrant scan at 2.5 Hz scan rate, and high PRF pulse Doppler processor with timing control circuitry for variable rate, variable slope timing and logic based on TTG and range rate in order to adjust and obtain the optimal blink rate. Communications may be made via standard digital data communications formats and protocols.

It is understood that a sensor embodying these characteristics, such as the AN/ALQ-156A Missile Warning Sensor, is well known. For example, the AN/ALQ-156A is used on a number of helicopters and fixed wing aircraft in US inventory. The sensor has a velocity resolution capability on the order of about 1 meter per second and a range of about 10 km on very small missile targets (much smaller than a typical ARM target, for example). Since the sensor operates at such short ranges, it has a very high PRF, (approximately 8000 to 10000 Hertz). Its operating RF frequency is in the UHF band (406–450 MHz) where there is an advantage in radar cross section against small missile targets (e.g. conesphere shaped). An object with a radial velocity of 335 meters per second will produce a Doppler shift of about 938 Hertz at an RF frequency of about 420 MHz. High resolution Doppler processing of four bursts of 2048 pulses is sufficient to resolve velocity changes of approximately 1 meter per second.

It is noted that ARM countermeasure techniques are most effective in the end game—i.e. the last 10 seconds or so of flight time. This is because the decoys are placed sufficiently close to the radar so as not be resolved by the missile seeker at meaningful ranges. In this manner, the ARM is induced to believe there are no decoys present until it is too late to compensate for their presence.

As an illustrative example, assume ARM acquisition by the AN/ALQ-156A at 10 km and the ARM is locked on to one of the decoys. The ARM velocity is nominally 335 meters per second and is approaching from a high angle of attack. The AN/ALQ-156A is within a few hundred meters of the decoy field. The time to go is almost 30 seconds. The leading decoy is switched to another decoy located 500 meters cross range from the decoy the ARM was tracking. The ARM then begins tracking the new leading decoy and aligns its airframe with the target. At about 10 km, the angular change is 0.15/10 or about 2.9 degrees. The change in velocity at the AN/ALQ-156A is Vo* (1−Cos(2.9)) or about 0.5 meters per second, un-resolvable by the AN/ALQ-156A system.

After about one half second the decoy position is changed again. Now the ARM is closer and the angular spread seen at the ARM seeker between one decoy and another is correspondingly larger. As the scenario progresses down to about 5 km, (just under 15 seconds to go), the angular change is 0.5/5 or about 5.8 degrees. The change in radial velocity is 1.7 meters per second, which is clearly resolvable by the AN/ALQ-156A sensor.

According to an aspect of the present invention, the velocity jump triggers another change in the leading decoy. The missile, in turn, cannot respond instantaneously but eventually levels out against the new source—the time it takes to do that is essentially the missile time constant. Thus, by knowing how long it took to stabilize after the first and second changes, the AN/ALQ-156A adaptively converges on that rate for the remainder of the flight time.

The above described technique has been shown to be effective for two decoy and three decoy configurations. For three decoy configurations, a fail safe feature reconfigures the basic logic to accommodate the remaining pair. For two decoy configurations, the fail safe mode will optimize the system (1 decoy+radar) survivability. In the event no decoys remain, the sensor, upon sensing Doppler shifts associated with the "still active" ARM, activates electronic circuitry associated with the missile warning radar system 119 so as to reconfigure the system to stop radar 100 transmitting until the ARM 12 impacts.

Having described a preferred embodiment of this invention, it will now be apparent to one of skill in the art that changes may be made without departing from the inventive concepts. For example, it is obvious that the number of decoys may be increased with a concomitant increase in effectiveness of deception. Further, it will be evident that conventional frequency controlling means could be added in the disclosed system so that the modulation of signals emitted by each decoy is forced to be substantially the same as the modulation of each interrogating signal from the radar. Further, while the decoy pulses have been described herein to completely cover the interrogating pulse, it is contemplated that perhaps some minimal portion of the interrogating pulse may not be completely covered, resulting in a concomitant increase in risk of the ARM homing in on the radar. In view of the foregoing it is felt that this invention should not be restricted to the disclosed embodiment, but rather should be limited only by the spirit and scope of the appended claims.

What is claimed is:

1. A method of protecting a pulse radar from a missile attempting to home on interrogating pulses emitted by such radar, said method comprising the steps of:

providing a plurality of decoys at different locations in the vicinity of the pulse radar, each one of the decoys being adapted, when activated, to emit pulses of a given amplitude and duration; and activating, when each one of the interrogating pulses is generated in the pulse radar, a selected decoy to lead the remaining decoys in the plurality of decoys for a period of time controlled by the range and range rate measurements of a pulse Doppler missile warning sensor; and changing the decoy selected to lead the remaining decoys in the plurality of decoys at a time determined by the pulse Doppler missile warning sensor thereby defining a blink rate associated with said decoys, to form a covering pulse overlapping the then emitted one of the interrogating pulses; and adaptively changing said blink rate and determining an associated maneuver change of said missile in response thereto, to obtain the blink rate that provides the maximum maneuver change associated with said missile.

2. The method of claim 1, further comprising the step of maintaining the obtained blink rate that provides the maximum maneuver change associated with said missile.

3. The method of claim 1, further comprising maintaining said obtained blink rate until termination of flight of said missile.

4. The method of claim 1, wherein the step of determining said maneuver change comprises determining a change in relative velocity associated with said missile.

5. The method of claim 4, wherein the step of adaptively changing said blink rate comprises using the previous blink rate if the present maneuver change is less than the previous maneuver change.

6. The method of claim 1, wherein said range and range rate measurements are provided by a pulse Doppler missile warning sensor.

7. The method of claim 1, wherein the blink rate is selected without prior knowledge of missile time constants.

8. A method of protecting a pulse radar from an ARM missile attempting to home on interrogating pulses emitted by such radar, the duty factor and amplitudes of the interrogating pulses being known, said method comprising the steps of :

providing a plurality of decoys at different locations in the vicinity of the pulse radar, each one of the decoys being adapted, when activated, to emit pulses having duty factors equal to or greater than the duty factor of the interrogating pulses and amplitudes greater than the amplitudes of the interrogating pulses;

activating, when each one of the interrogating pulses is generated in the pulse radar, a selected decoy to lead the remaining decoys in the plurality of decoys for a period of time controlled by the range and range rate measurements of a pulse Doppler missile warning sensor to form a covering pulse overlapping the then emitted one of the interrogating pulses; and changing the decoy selected to lead the remaining decoys in a plurality of decoys at the time determined by range and range rate measurements from the pulse Doppler missile warning sensor thereby to change the ARM aim point and causing thereby a change in the ARM range and range rate; and monitoring reaction from said ARM in response to said changing sequences and adapting the rate of change of said changing sequences in response to said ARM reactions.

9. The method of claim 8, wherein the step of monitoring comprises sensing a Doppler shift associated with said ARM in response to a maneuver.

10. The method of claim 8, wherein said Doppler shift is associated with a change in velocity of said ARM.

11. The method of claim 8, further comprising sweeping the decoy blink rate over small time increments to determine the largest range rate differences associated with said ARM.

12. A method of protecting a radar from a missile attempting to home on interrogating pulses emitted by such radar, said method comprising the steps of:

providing a plurality of decoys at different locations in the vicinity of the pulse radar, each one of the decoys being adapted, when activated, to emit pulses of a given amplitude, frequency and duration;

activating, when each one of the interrogating pulses is generated in the pulse radar, a selected decoy to lead the remaining decoys in the plurality of decoys, for a period of time controlled by the range and range rate measurements of a pulse Doppler missile warning sensor, to form a composite covering pulse overlapping the then emitted one of the interrogating pulses; and changing the decoy selected to lead the remaining decoys in a plurality of decoys at a time determined by the range and range rate measurements of the pulse Doppler missile warning sensor thereby defining a blink rate associated with said decoys; and receiving data associated with a Doppler shift of said missile indicative of a maneuver change; and adaptively changing the blink rate over a given interval and processing the received data indicative of corresponding maneuver changes of said missile to obtain the blink rate that provides the maximum maneuver change associated with said missile.

13. A method of protecting a radar from a missile attempting to home on interrogating pulses emitted by said radar, the method comprising the steps of:

providing a plurality of decoys at different locations in the vicinity of the radar, each one of the decoys being adapted, when activated, to emit pulses of a given amplitude, frequency and duration;

sequentially activating a selected decoy in the plurality of decoys to be the leading decoy in time relative to the other decoys and the radar to form a covering pulse overlapping the then emitted one of the interrogating pulses; and adaptively changing the blink rate associated with decoys in response to a sensed maneuver change of the missile.

* * * * *